(12) United States Patent  
Takahashi

(10) Patent No.: US 10,365,083 B2  
(45) Date of Patent: Jul. 30, 2019

(54) MOTOR CONTROL SYSTEM

(71) Applicant: TOYOTA JIDOSHA KABUSHIKI KAISHA, Toyota-shi, Aichi-ken (JP)

(72) Inventor: Taro Takahashi, Tokyo (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 15/839,136

(22) Filed: Dec. 12, 2017

(65) Prior Publication Data

US 2018/0180399 A1 Jun. 28, 2018

(30) Foreign Application Priority Data

Dec. 26, 2016 (JP) ................................. 2016-250716

(51) Int. Cl.
*G01L 3/00* (2006.01)
*G01L 5/00* (2006.01)
*G01B 7/30* (2006.01)
*B25J 9/16* (2006.01)
*B60G 17/019* (2006.01)
*B62D 5/04* (2006.01)
(Continued)

(52) U.S. Cl.
CPC .............. *G01B 7/30* (2013.01); *B25J 9/1633* (2013.01); *B60G 17/019* (2013.01); *B62D 5/0463* (2013.01); *G01L 3/109* (2013.01); *G01L 5/0042* (2013.01); *G01L 25/003* (2013.01); *G05B 2219/39188* (2013.01)

(58) Field of Classification Search
CPC ........ G01B 7/30; B25J 9/1633; B60G 17/019; B62D 5/0463; G01L 3/109; G01L 5/0042; G01L 25/003; G05B 2219/39188

USPC ..................................................... 73/862.325
See application file for complete search history.

(56) References Cited

U.S. PATENT DOCUMENTS 4,989,161 A 1/1991 Oaki
5,932,980 A * 8/1999 Siraky ..................... H02P 23/16
318/15

(Continued)

FOREIGN PATENT DOCUMENTS

EP 3032735 A1 6/2016
JP 2004-080973 A 3/2004
JP 2013257857 A 12/2013

OTHER PUBLICATIONS

"Physikalisches Praktikum Tragheitsmoment und Drehschwingung", Cottbus Deutschland, Jul. 15, 2015, pp. 1-8.

(Continued)

*Primary Examiner* — Max H Noori
(74) *Attorney, Agent, or Firm* — Hunton Andrews Kurth LLP

(57) ABSTRACT

A motor control system includes a motor, a rotational angle sensor that detects a rotational angle of a motor shaft of the motor, a torque sensor that detects shaft torsion torque between the motor shaft, and an output shaft fixed to a load member driven by the motor, and a motor controller that controls the motor. The motor controller estimates a rotational angle of the output shaft, based on the rotational angle of the motor shaft, the shaft torsion torque, and torsional rigidity obtained in advance with respect to a region between the motor shaft and the output shaft, and controls the motor, using the estimated rotational angle of the output shaft.

4 Claims, 2 Drawing Sheets

(51) Int. Cl.
    *G01L 3/10*           (2006.01)
    *G01L 25/00*         (2006.01)

(56) References Cited

U.S. PATENT DOCUMENTS

| | | | |
|---|---|---|---|
| 6,371,218 B1 * | 4/2002 | Amano | B25B 23/1405 |
| | | | 173/176 |
| 8,975,854 B1 * | 3/2015 | Poulad | H02P 3/025 |
| | | | 318/2 |
| 9,043,119 B2 * | 5/2015 | Horii | F02D 29/02 |
| | | | 701/102 |
| 9,126,378 B2 * | 9/2015 | Ito | B30B 1/266 |
| 2004/0113579 A1 | 6/2004 | Zhang et al. | |
| 2012/0103643 A1 * | 5/2012 | Binder | B25D 16/003 |
| | | | 173/2 |
| 2013/0090761 A1 * | 4/2013 | Sejimo | B25J 13/085 |
| | | | 700/245 |

OTHER PUBLICATIONS

European Patent Office, Extended European Search Report dated May 7, 2018 in EP Application No. 17205971, 9 pages.

* cited by examiner

MOTOR CONTROL SYSTEM

INCORPORATION BY REFERENCE

The disclosure of Japanese Patent Application No. 2016-250716 filed on Dec. 26, 2016 including the specification, drawings and abstract is incorporated herein by reference in its entirety.

BACKGROUND

1. Technical Field

The disclosure relates to a motor control system.

2. Description of Related Art

In recent years, a servomotor is employed in a joint of a robot arm, for example, for driving a link that constitutes the robot arm with high accuracy. In Japanese Patent Application Publication No. 2004-80973 (JP 2004-80973 A), a motor control system using a full closed control method is disclosed which performs velocity control based on a velocity signal of a motor, and performs position control based on a position signal of a load member driven by the motor.

SUMMARY

The inventor and others found the following problems concerning the motor control system. The motor control system of the full closed control type as disclosed in JP 2004-80973 A generally includes an output shaft rotational angle sensor that detects the rotational angle $\theta_L$ of an output shaft fixed to the load member driven by the motor, in addition to a motor shaft rotational angle sensor that detects the rotational angle $\theta_M$ of a motor shaft of the motor. Therefore, the position control can be performed with high accuracy. However, the configuration of the motor control system may lead to increase of the size of the system, and increase of the manufacturing cost.

On the other hand, in the case where the output shaft rotational angle sensor is not provided, it is considered to perform control simply using $\theta_M/r$ obtained by dividing the rotational angle $\theta_M$ of the motor shaft by the reduction ratio r, as the rotational angle $\theta_L$ of the output shaft. However, the rotational angle $\theta_L$ thus obtained may deviate from the actual rotational angle $\theta_L$ of the output shaft due to shaft torsion, and the position control may not be accurately performed.

This disclosure provides a motor control system that can perform position control with high accuracy, without using any output shaft rotational angle sensor.

A motor control system according to one aspect of the disclosure includes a motor, a rotational angle sensor that detects a rotational angle of a motor shaft of the motor, a torque sensor that detects shaft torsion torque between the motor shaft, and an output shaft fixed to a load member driven by the motor, and a motor controller that controls the motor. The motor controller estimates a rotational angle of the output shaft, based on the rotational angle of the motor shaft detected by the rotational angle sensor, the shaft torsion torque detected by the torque sensor, and a torsional rigidity obtained in advance with respect to a region between the motor shaft and the output shaft, and the motor controller controls the motor, using the estimated rotational angle of the output shaft.

The motor control system according to the above aspect of the disclosure estimates the rotational angle of the output shaft, based on the shaft torsion torque detected by the torque sensor, and the torsional rigidity obtained in advance with respect to the region between the motor shaft and the output shaft, in addition to the rotational angle of the motor shaft detected by the rotational angle sensor. Therefore, the system can perform position control with high accuracy, without using any output shaft rotational angle sensor.

In the motor control system as described above, a value of the torsional rigidity may be changed, according to the shaft torsion torque detected by the torque sensor. With this arrangement, the rotational angle of the output shaft can be estimated with further improved accuracy, and position control can be performed with further improved accuracy.

In the motor control system as described above, at least one of a rotational angular velocity and a rotational angular acceleration of the output shaft may be estimated, based on the rotational angle of the motor shaft detected by the rotational angle sensor, the shaft torsion torque detected by the torque sensor, and the torsion rigidity obtained in advance with respect to the region between the motor shaft and the output shaft, and the rotational angle of the output shaft may be estimated, based on at least one of the estimated rotational angular velocity and the estimated rotational angular acceleration of the output shaft. With this arrangement, noise resistance can be improved.

According to this disclosure, it is possible to provide the motor control system that can perform position control with high accuracy, without using any output shaft rotational angle sensor.

BRIEF DESCRIPTION OF THE DRAWINGS

Features, advantages, and technical and industrial significance of exemplary embodiments will be described below with reference to the accompanying drawings, in which like numerals denote like elements, and wherein.

DETAILED DESCRIPTION OF EMBODIMENTS

Some embodiments of the disclosure will be described in detail with reference to the drawings. It is, however, to be understood that this disclosure is not limited to the following embodiments. Also, the following description and the drawings are simplified as needed, for the sake of clarity of explanation.

<Configuration of Motor Control System>

Figure 1:
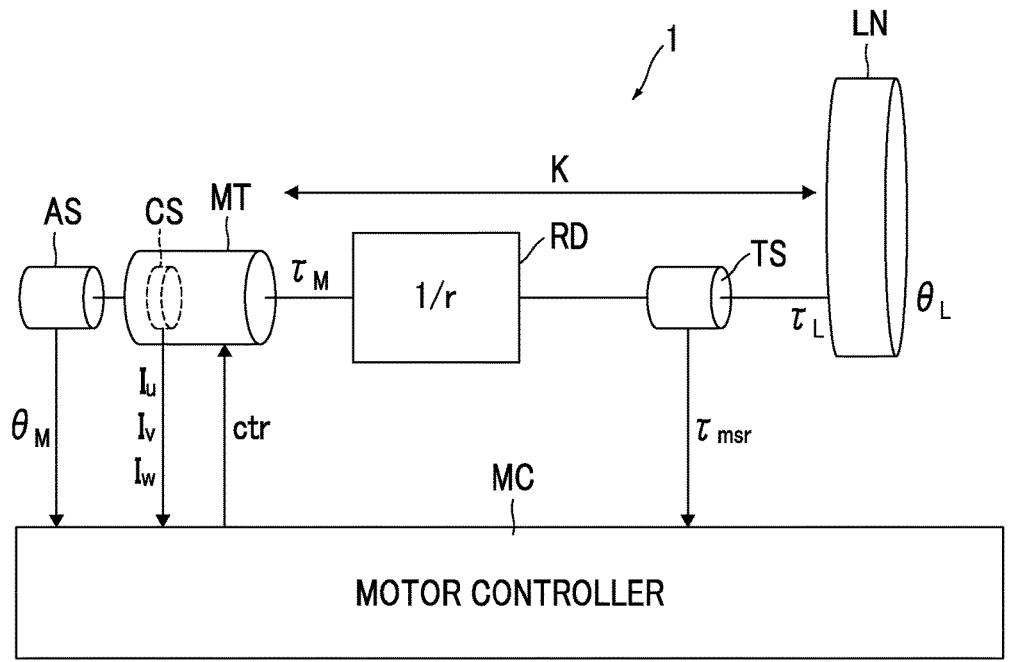
FIG. 1 is a block diagram showing a motor control system according to a first embodiment.

Initially, referring to FIG. 1, a motor control system according to a first embodiment will be described. FIG. 1 shows the motor control system according to the first embodiment. As shown in FIG. 1, the motor control system 1 according to this embodiment includes a motor MT, a speed reducer RD, a motor shaft rotational angle sensor AS, a torque sensor TS, and a motor controller MC. A link LN as a load member is driven by the motor MT, via the speed reducer RD. The motor control system 1 according to this embodiment is a control system of a servomotor provided in a joint of a robot arm, for driving the link LN that constitutes the robot arm, for example.

The motor MT is an AC servomotor, for example. The motor MT drives the link LN based on a control signal ctr transmitted from the motor controller MC. The control signal ctr is a Pulse Width Modulation (PWM) signal, for example. The motor MT incorporates a current sensor CS that detects three-phase alternating current (which will be called "motor current") $I_u$, $I_v$, $I_w$, that flows through the motor MT. The motor current $I_u$, $I_v$, $I_w$ detected by the current sensor CS is fed back to the motor controller MC. In FIG. 1, torque applied to a motor shaft, or motor shaft torque $\tau_M$, is also indicated.

The speed reducer RD is a strain wave gearing, for example, and is provided between the motor shaft of the motor MT and an output shaft fixed to the link LN. The speed reducer RD reduces the rotational speed of the motor shaft of the motor MT to 1/r (r: reduction ratio), and transmits the resulting rotation to the output shaft fixed to the link LN.

The torque sensor TS detects shaft torsion torque $\tau_{msr}$ produced between the motor shaft of the motor MT and the output shaft fixed to the link LN. The shaft torsion torque $\tau_{msr}$ is a product $S \times K_{strain}$ of the amount of strain S measured with a strain gauge of the torque sensor TS, and a coefficient of rigidity $K_{strain}$ of a strain measuring unit. The shaft torsion torque $\tau_{msr}$ detected by the torque sensor TS is transmitted to the motor controller MC. In FIG. 1, torque applied to the output shaft, or output shaft torque $\tau_L$, is also indicated.

The motor shaft rotational angle sensor AS is an encoder that detects the rotational angle of the motor shaft of the motor MT, or motor shaft rotational angle $\theta_M$. The motor shaft rotational angle $\theta_M$ detected by the motor shaft rotational angle sensor AS is transmitted to the motor controller MC.

The motor controller MC controls the motor MT, based on three signals, more specifically, the motor current $I_u$, $I_v$, $I_w$, detected by the current sensor CS, shaft torsion torque $\tau_{msr}$ detected by the torque sensor TS, and the motor shaft rotational angle $\theta_M$ detected by the motor shaft rotational angle sensor AS.

Here, the motor controller MC estimates the rotational angle of the output shaft fixed to the link LN, or output shaft rotational angle $\theta_L$, based on the shaft torsion torque $\tau_{msr}$ and the motor shaft rotational angle $\theta_M$, and controls the motor MT. A method of estimating the output shaft rotational angle $\theta_L$ by the motor controller MC will be described in detail later.

Although not illustrated in FIG. 1, the motor controller MC includes a computing unit, such as CPU (Central Processing Unit), and a storage unit, such as RAM (Random Access Memory) and ROM (Read Only Memory), in which various control programs, data, etc. are stored.

<Method of Estimating Output Shaft Rotational Angle $\theta_L$>

In the following, the method of estimating the output shaft rotational angle $\theta_L$ by the motor controller MC will be described. The angle of torsion from the motor shaft to the output shaft can be expressed as $\theta_M - r \times \theta_L$, using the motor shaft rotational angle $\theta_M$, output shaft rotational angle $\theta_L$, and the reduction ratio r. A relationship as indicated below in Eq. (1) is established among the torsional angle $\theta_M - r \times \theta_L$, torsional rigidity K of a region from the motor shaft to the output shaft, and the shaft torsion torque $\tau_{msr}$ detected by the torque sensor TS.

$$\theta_M - r \cdot \theta_L = \frac{\tau_{msr}}{K} \quad \text{Eq. (1)}$$

Accordingly, the output shaft rotational angle $\theta_L$ can be estimated according to the following equation (2) derived from Eq. (1) above.

$$\theta_L = \frac{\theta_M}{r} - \frac{\tau_{msr}}{r \cdot K} \quad \text{Eq. (2)}$$

Thus, the motor control system according to the first embodiment estimates the output shaft rotational angle $\theta_L$, using the torsional rigidity K of the region from the motor shaft to the output shaft, and the shaft torsion torque $\tau_{msr}$ detected by the torque sensor TS, in addition to the rotational angle $\theta_M$ of the motor shaft and the reduction ratio r. Therefore, position control can be performed with higher accuracy, as compared with the case where $\theta_M/r$ obtained by dividing the rotational angle $\theta_M$ of the motor shaft by the reduction ratio r is simply used as the rotational angle $\theta_L$ of the output shaft. Namely, the motor control system according to the first embodiment can perform position control with high accuracy, without using any output shaft rotational angle sensor.

As shown in FIG. 1, the torsional rigidity K used for estimation of the output shaft rotational angle $\theta_L$ is determined based on the rigidity possessed by the speed reducer RD and the rigidity possessed by the torque sensor TS. A value of torsional rigidity K obtained in advance is stored in the storage unit within the motor controller MC. While the value of the torsional rigidity K may be set as a constant value, it actually changes according to a value of the shaft torsion torque. Therefore, the value of the torsional rigidity K used for estimation of the output shaft rotational angle $\theta_L$ may be changed, according to the value of the shaft torsion torque $\tau_{msr}$ detected by the torque sensor TS, so that the output shaft rotational angle $\theta_L$ is estimated with higher accuracy.

<Method of Determining Torsional Rigidity K>

Figure 2:
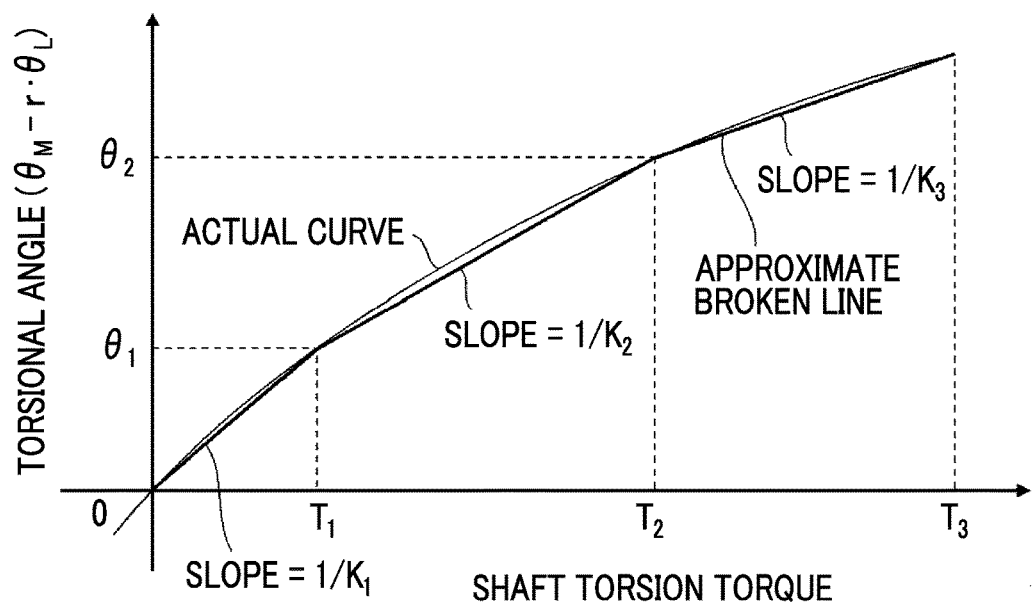
FIG. 2 is a graph showing change of torsional angle relative to shaft torsion torque.

Referring next to FIG. 2, one example of the method of determining a value of the torsional rigidity K will be described. FIG. 2 is a graph showing change of the torsional angle relative to the shaft torsion torque. As indicated by an actual curve in FIG. 2, the torsional angle changes such that the amount of increase of the torsional angle relative to the amount of increase of the shaft torsion torque is gradually reduced as the shaft torsion torque becomes larger. The value of the torsional rigidity K at each value of torsion torque is an inverse of a slope of a tangent of the actual curve, and gradually changes. Therefore, if the actual curve is to be reproduced, the data amount of values of the torsional rigidity K becomes enormously large.

Thus, as indicated by approximate broken lines in FIG. 2, change of the torsional angle relative to the shaft torsion torque is approximated by broken lines. For example, as shown in FIG. 2, the torsional rigidity K is equal to $K_1$ in a section where the value of the shaft torsion torque is between 0 and $T_1$, and the torsional rigidity K is equal to $K_2$ in a section where the value of the shaft torsion torque is between $T_1$ and $T_2$, while the torsional rigidity K is equal to $K_3$ in a section where the value of the shaft torsion torque is between $T_2$ and $T_3$.

In this case, when the value of the shaft torsion torque $\tau_{msr}$ detected by the torque sensor TS is between 0 and $T_1$, the torsional angle $\theta_M - r \times \theta_L$ can be expressed by the following equation (3), using the torsional rigidity $K=K_1$.

$$\theta_M - r \cdot \theta_L = \frac{\tau_{msr1}}{K_1} \quad \text{Eq. (3)}$$

Accordingly, the output shaft rotational angle $\theta_L$ can be estimated, according to the following equation (4) derived from Eq. (3) above.

$$\theta_L = \frac{\theta_M}{r} - \frac{\tau_{msr1}}{r \cdot K_1} \quad \text{Eq. (4)}$$

Also, when the value of the shaft torsion torque $\tau_{msr}$ detected by the torque sensor TS is between $T_1$ and $T_2$, the torsional angle $\theta_M - r \times \theta_L$ can be expressed by the following equation (5), using the torsional rigidity $K=K_2$, and the torsional angle $\theta_1$ at the shaft torsion torque $T_1$.

$$\theta_M - r \cdot \theta_L = \theta_1 + \frac{\tau_{msr} - T_1}{K_2} \quad \text{Eq. (5)}$$

Accordingly, the output shaft rotational angle $\theta_L$ can be estimated, according to the following equation (6) derived from Eq. (5) above.

$$\theta_L = \frac{\theta_M}{r} - \frac{\theta_1}{r} - \frac{\tau_{msr} - T_1}{r \cdot K_2} \quad \text{Eq. (6)}$$

Similarly, when the value of the shaft torsion torque $\tau_{msr}$ detected by the torque sensor TS is between $T_2$ and $T_3$, the torsional angle $\theta_M - r \times \theta_L$ can be expressed by the following equation (7), using the torsional rigidity $K=K_3$, and the torsional angle $\theta_2$ at the shaft torsion torque $T_2$.

$$\theta_M - r \cdot \theta_L = \theta_2 + \frac{\tau_{msr} - T_2}{K_3} \quad \text{Eq. (7)}$$

Accordingly, the output shaft rotational angle $\theta_L$ can be estimated according to the following equation (8) derived from Eq. (7) above.

$$\theta_L = \frac{\theta_M}{r} - \frac{\theta_2}{r} - \frac{\tau_{msr} - T_2}{r \cdot K_3} \quad \text{Eq. (8)}$$

As described above, values of the shaft torsion torque are divided into two or more sections, and the torsional rigidity K in each section is set to a constant value, so that the amount of data of the torsional rigidity K can be reduced, and the output shaft rotational angle $\theta_L$ can be estimated with high accuracy.

Figure 3:
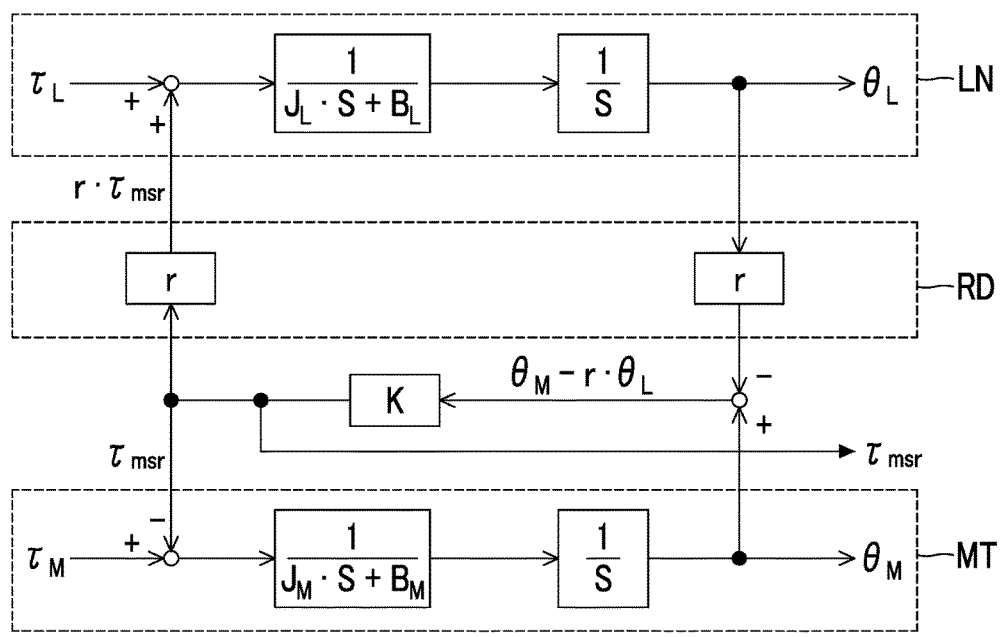
FIG. 3 is a block diagram showing relationships among parameters (motor shaft rotational angle $\theta_M$, motor shaft torque $\tau_M$, output shaft rotational angle $\theta_L$, output shaft torque $\tau_L$) in the motor control system shown in FIG. 1.

Next, referring to FIG. 3, a motor control system according to a second embodiment will be described. FIG. 3 shows relationships among parameters (motor shaft rotational angle $\theta_M$, motor shaft torque $\tau_M$, output shaft rotational angle $\theta_L$, output shaft torque $\tau_L$) in the motor control system shown in FIG. 1. In FIG. 3, S means differential, and 1/S means integral.

As shown in FIG. 3, $K \times (\theta_M - r \times \theta_L)$ as the product of the torsional angle $\theta_M - r \times \theta_L$ and the torsional rigidity K between the motor MT and the link LN is detected by the torque sensor TS as the shaft torsion torque $\tau_{msr}$.

Referring to FIG. 3, a motion equation of rotation of the motor MT can be represented by the following equation (9), using the moment of inertia $J_M$ of the motor MT, and the coefficient of viscous friction $B_M$.

$$J_M \cdot \ddot{\theta}_M + B_M \cdot \dot{\theta}_M = \tau_M - \tau_{msr} = \tau_M - K \cdot (\theta_M - r \cdot \theta_L) \quad \text{Eq. (9)}$$

Referring to FIG. 3, a motion equation of rotation of the link LN can be represented by the following equation (10), using the moment of inertia $J_L$ of the link LN, and the coefficient of viscous friction $B_L$.

$$J_L \cdot \ddot{\theta}_L + B_L \cdot \dot{\theta}_L = \tau_L + r \cdot \tau_{msr} = \tau_M + r \cdot K \cdot (\theta_M - r \cdot \theta_L) \quad \text{Eq. (10)}$$

From Eq. (9) and Eq. (10) above, an equation of state of the motor control system can be expressed by the following equation (11) using matrices.

$$\frac{d}{dt}\begin{bmatrix} \theta_M \\ \dot{\theta}_M \\ \theta_L \\ \dot{\theta}_L \\ \tau_L \end{bmatrix} = \begin{bmatrix} 0 & 1 & 0 & 0 & 0 \\ -\frac{K}{J_M} & -\frac{B_M}{J_M} & \frac{r \cdot K}{J_M} & 0 & 0 \\ 0 & 0 & 0 & 1 & 0 \\ \frac{r \cdot K}{J_L} & 0 & -\frac{r^2 \cdot K}{J_L} & -\frac{B_L}{J_L} & \frac{1}{J_L} \\ 0 & 0 & 0 & 0 & 0 \end{bmatrix} \begin{bmatrix} \theta_M \\ \dot{\theta}_M \\ \theta_L \\ \dot{\theta}_L \\ \tau_L \end{bmatrix} + \begin{bmatrix} 0 \\ \frac{1}{J_M} \\ 0 \\ 0 \\ 0 \end{bmatrix} \tau_M \quad \text{Eq. (11)}$$

If the matrices and variable (motor shaft torque $\tau_M$) in Eq. (11) are denoted by symbols indicated below, Eq. (11) can be expressed as the following equation (12).

$$\begin{bmatrix} \theta_M \\ \dot{\theta}_M \\ \theta_L \\ \dot{\theta}_L \\ \tau_L \end{bmatrix} = x, \quad \begin{bmatrix} 0 & 1 & 0 & 0 & 0 \\ -\frac{K}{J_M} & -\frac{B_M}{J_M} & \frac{r \cdot K}{J_M} & 0 & 0 \\ 0 & 0 & 0 & 1 & 0 \\ \frac{r \cdot K}{J_L} & 0 & -\frac{r^2 \cdot K}{J_L} & -\frac{B_L}{J_L} & \frac{1}{J_L} \\ 0 & 0 & 0 & 0 & 0 \end{bmatrix} = A, \quad \text{Eq. (12)}$$

$$\begin{bmatrix} 0 \\ \frac{1}{J_M} \\ 0 \\ 0 \\ 0 \end{bmatrix} = B, \quad \tau_M = u$$

$$\dot{x} = Ax + Bu$$

In Eq. (12), x denotes variables, and u denotes an input. Namely, the motor shaft torque $\tau_M$ in Eq. (11) is a torque command value as an input.

On the other hand, an output equation with respect to the motor shaft rotational angle $\theta_M$ and shaft torsion torque $\tau_{msr}$ that can be measured can be expressed by the following equation (13).

$$\begin{bmatrix} \theta_M \\ \tau_{msr} \end{bmatrix} = \begin{bmatrix} 1 & 0 & 0 & 0 & 0 \\ K & 0 & -r \cdot K & 0 & 0 \end{bmatrix} \begin{bmatrix} \theta_M \\ \dot{\theta}_M \\ \theta_L \\ \dot{\theta}_L \\ \tau_L \end{bmatrix} \quad \text{Eq. (13)}$$

If the matrices in Eq. (13) are denoted by symbols indicated below, Eq. (13) can be expressed as the following equation (14).

$$\begin{bmatrix} \theta_M \\ \tau_{msr} \end{bmatrix} = y, \begin{bmatrix} 1 & 0 & 0 & 0 & 0 \\ K & 0 & -r \cdot K & 0 & 0 \end{bmatrix} = C, \begin{bmatrix} \theta_M \\ \dot{\theta}_M \\ \theta_L \\ \dot{\theta}_L \\ \tau_L \end{bmatrix} = x \quad \text{Eq. (14)}$$

$$y = Cx$$

The variables x can be estimated according to the following equation (15), using an observer method, from Eq. (12) as the equation of state and Eq. (14) as the output equation. Here, since the output shaft rotational angle $\theta_L$ is included in the variables x, the output shaft rotational angle $\theta_L$ can be estimated. In the following equation (15), estimated value of the variables x are expressed as x̂.

$$\dot{\hat{x}} = A\hat{x} + Bu + L(y - C\hat{x}) \quad \text{Eq. (15)}$$

As indicated in Eq. (15), in the motor control system according to the second embodiment, the variables x are estimated by using differentials of the variables x. As described above, the variables x include the rotational angular velocity of the output shaft obtained by differentiating the rotational angle $\theta_L$ of the output shaft, in addition to the rotational angle $\theta_L$ of the output shaft. Therefore, in the motor control system according to the second embodiment, the output shaft rotational angle $\theta_L$ is estimated by using at least one of the rotational angular velocity of the output shaft obtained by differentiating the rotational angle $\theta_L$ of the output shaft, and the rotational angular acceleration of the output shaft obtained by differentiating the rotational angle $\theta_L$ of the output shaft twice.

The above-indicated equation (Eq.) (15) means that estimated values Cx̂ of the measurement values y using the estimated values x̂ of the variables x are compared with the actual measurement values y, and the estimated values x̂ are corrected according to differences y−Cx̂ between these values. In Eq. (15), constant L is a gain that determines the amount of correction. While the estimated values x̂ converge more quickly as L is larger, the estimated values x̂ may not converge due to noise of the measurement values y if L is excessively large.

As described above, in the motor control system according to the second embodiment, the estimated values Cx̂ of the measurement values y are compared with the actual measurement values y, and the estimated values x̂ are corrected according to the differences y−Cx̂ between these values. Therefore, the system of the second embodiment has higher noise resistance, as compared with the system of the first embodiment that directly uses measurement values. Accordingly, the motor control system according to the second embodiment can perform position control with high accuracy, without using the output shaft rotational angle sensor.

It is to be understood that this disclosure is not limited to the above embodiments, but the embodiments may be modified as needed without departing from the scope of the disclosure.

What is claimed is:

1. A motor control system comprising:
   a motor;
   a rotational angle sensor that is configured to detects a rotational angle of a motor shaft of the motor;
   a torque sensor that is configured to detects a shaft torsion torque between the motor shaft, and an output shaft fixed to a load member driven by the motor; and
   a motor controller that is configured to controls the motor, wherein
   the motor controller is configured to estimates a rotational angle of the output shaft, based on the rotational angle of the motor shaft detected by the rotational angle sensor, the shaft torsion torque detected by the torque sensor, and a torsional rigidity obtained in advance with respect to a region between the motor shaft and the output shaft, and
   the motor controller is configured to controls the motor, using the rotational angle of the output shaft.

2. The motor control system according to claim 1, wherein a value of the torsional rigidity is changed, according to the shaft torsion torque detected by the torque sensor.

3. The motor control system according to claim 1, wherein at least one of a rotational angular velocity and a rotational angular acceleration of the output shaft is estimated, based on the rotational angle of the motor shaft detected by the rotational angle sensor, the shaft torsion torque detected by the torque sensor, and the torsion rigidity obtained in advance with respect to the region between the motor shaft and the output shaft, and the rotational angle of the output shaft is estimated, based on at least one of the rotational angular velocity and the rotational angular acceleration of the output shaft.

4. The motor control system according to claim 2, wherein values of the shaft torsion torque are divided into two or more sections, and the torsional rigidity in each section is set to a constant value.

* * * * *